United States Patent [19]
Hill

[11] 3,988,044
[45] Oct. 26, 1976

[54] CONTINUAL QUICK SERVICE VALVE DEVICE WITH FAST CHARGING MEANS

[75] Inventor: Theodore B. Hill, North Versailles, Pa.

[73] Assignee: Westinghouse Air Brake Company, Wilmerding, Pa.

[22] Filed: Dec. 22, 1975

[21] Appl. No.: 643,359

[52] U.S. Cl. .................................... 303/82; 303/38
[51] Int. Cl.² ......................................... B60T 15/42
[58] Field of Search .................. 303/37, 38, 39, 81, 303/82, 83

[56] References Cited
UNITED STATES PATENTS

| | | | |
|---|---|---|---|
| 2,016,411 | 10/1935 | Cook | 303/83 |
| 2,137,018 | 11/1938 | Hewitt | 303/81 |
| 3,175,871 | 3/1965 | Wilson | 303/82 |
| 3,240,540 | 3/1966 | McClure | 303/83 |

*Primary Examiner*—Duane A. Reger
*Attorney, Agent, or Firm*—W. F. Poore; R. W. McIntire, Jr.

[57] ABSTRACT

This invention relates to a cycling-type continual quick service valve device which embodies therein a quick service valve means that comprises two valves each operatively connected to an abutment subject to fluid under pressure supplied from a train brake pipe through a first restriction to a chamber on one side thereof and subject to fluid under pressure supplied from the brake pipe to a chamber at the opposite side and to a quick service chamber via two restrictions arranged in parallel and in series with a third restriction, the sizes of these three restrictions being such that the rate of flow of fluid under pressure therethrough is less than the rate of flow through the first restriction. A check valve is arranged in series with one of the two parallel arranged restrictions so as to prevent flow therethrough in the direction from the chamber at the opposite side of the abutment to the brake pipe. Upon a service rate of reduction of pressure in the train brake pipe effected independently of this valve device, the pressure in the chamber at the one side of the abutment is reduced via the first restriction at a more rapid rate than the pressure can be reduced in the chamber at the opposite side of this abutment via the third restriction and the other one of the two parallel arranged restrictions.

6 Claims, 6 Drawing Figures

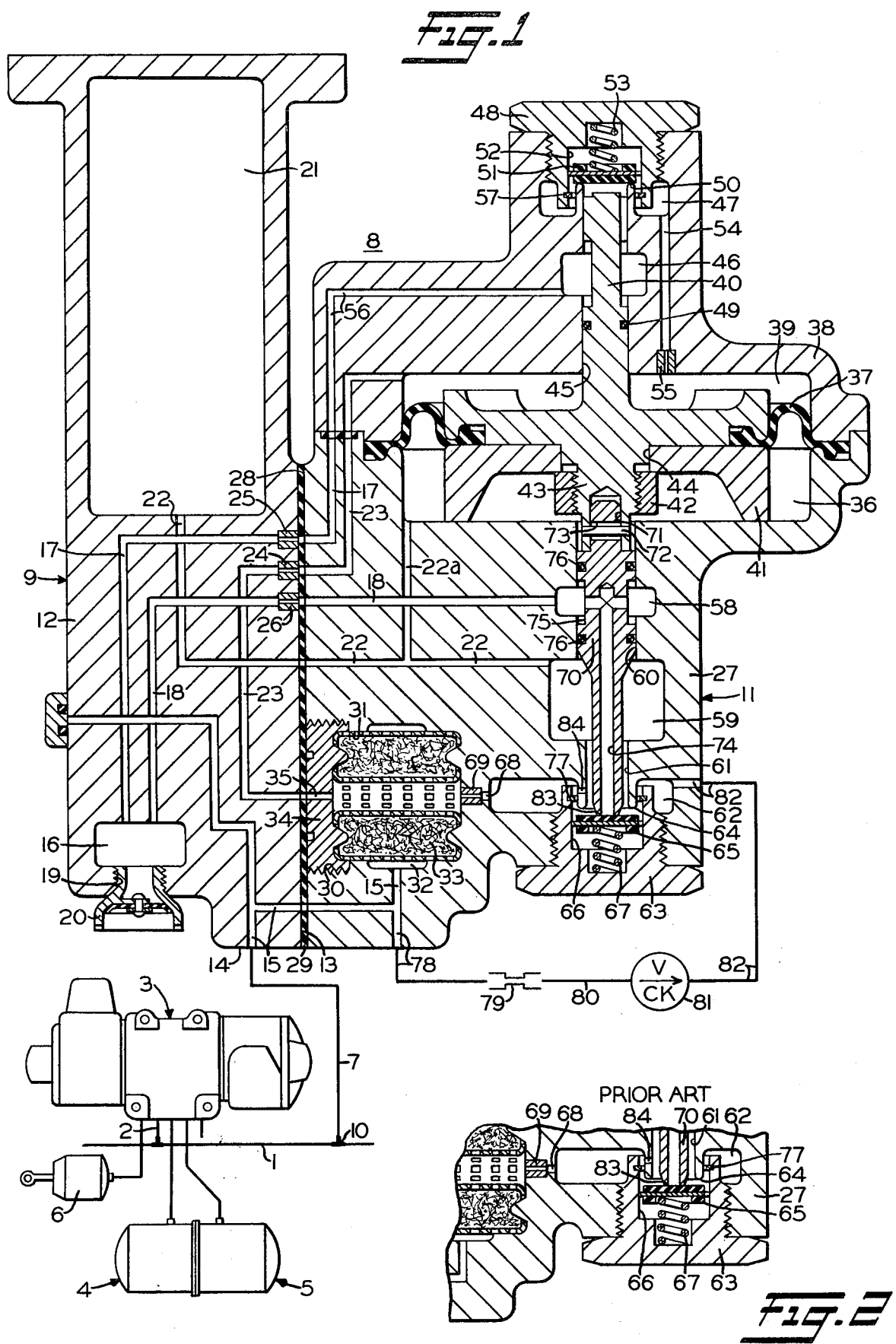

CONTINUAL QUICK SERVICE VALVE DEVICE WITH FAST CHARGING MEANS

BACKGROUND OF THE INVENTION

A heretofore known prior art cycling-type continual quick service valve device has two valves operatively connected, one directly and the other by a lost-motion connection, to an abutment that has a pair of chambers disposed on the respective opposite sides thereof that are charged respectively with fluid under pressure from a train brake pipe via two restrictions of unequal size the smaller restriction constituting two chokes arranged in series. A reduction of train brake pipe pressure effected by an engineer's brake valve device causes backflow of fluid under pressure through these two restrictions of unequal size to thereby establish successive differential fluid pressure forces that act in opposite directions on the abutment to cause it to sequentially operate the one valve to release fluid under pressure from the train brake pipe and the chamber at one side of the abutment and thereafter the other valve to release fluid under pressure from the chamber at the opposite side of this abutment and a quick service chamber connected thereto to atmosphere until the two valves terminate the release of fluid under pressure from both the train brake pipe and the quick service chamber to atmosphere. This prior art cycling-type continual quick service valve device will continue to operate to sequentially vent the train brake pipe and the quick service chamber in cycles so long as the engineer's brake valve device is effective to release fluid under pressure from the train brake pipe to atmosphere.

It is apparent that the size of the smaller of the two restrictions determines the times required to establish the first differential fluid pressure force on the abutment when an initial reduction of pressure in a train brake pipe is effected by means such as an engineer's brake valve device.

Furthermore, it is apparent that the size of this smaller restriction determines the time required to establish equal pressures in the chambers on the respective opposite sides of the abutment upon termination of the release of fluid under pressure from these chambers by operation of the two valves of this continual quick service valve device while the engineer's brake valve device remains effective to continue the release of fluid under pressure from these chambers to atmosphere. Thus, this smaller one of the two restrictions determines the time required for this prior art cycling-type continual quick service valve device to complete one cycle. Consequently, it will be obvious that the time required for completing one cycle can be reduced by reducing the time required to establish equal pressures on the opposite sides of the abutment subsequent to operation of the continual quick service valve device to terminate the release of fluid under pressure from the train brake pipe and the quick service chamber to atmosphere.

The Association of American Railroads specifies that leakage from a train brake pipe must not reduce the pressure therein more than five pounds per square inch in one minute. Therefore, the difference in size of the above-mentioned two restrictions in the prior art continual quick service valve device must be such that a reduction in brake pipe pressure of five pounds per square inch in one minute as the result of leakage of fluid under pressure from the train brake pipe will not establish, as the result of flow of fluid under pressure from the chambers at the respective opposite sides of the abutment to the train brake pipe, the differential fluid pressure force on this abutment required to operate the two valves connected thereto in the manner described above. Accordingly, it is apparent that the allowable brake pipe leakage dictates that the size of the smaller of the two restrictions cannot be so small that the maximum allowable brake pipe leakage would cause an undesired operation of this prior art cycling-type continual quick service valve device.

Accordingly, it is the general purpose of this invention to provide a cycling-type continual quick service valve device, that has an abutment directly connected to a stem that operates one of a pair of valves and a lost-motion connection with the other valve, with novel communication means through which fluid under pressure may be supplied to and released from a pair of chambers at the respective opposite sides of the abutment. This novel communicating means is so constructed that these chambers may be initially charged at unequal rates from a train brake pipe, the communication with that one of the two chambers that is charged at the slower rate being so constructed as to provide that fluid under pressure may be supplied to this chamber at a faster rate than fluid under pressure may be released therefrom thus enabling fast equalization of pressure between the two chambers upon the pressure in the other chamber exceeding that in the one chamber subsequent to operation of the two valves to terminate the release of fluid under pressure from these chambers to atmosphere, yet insuring that these chambers are charged at unequal rates from a train brake pipe, and that, upon an initial simultaneous release of fluid under pressure from both chambers in response to a reduction of pressure in the train brake pipe effected by the release of fluid under pressure therefrom, the rate of release of fluid under pressure from the other chamber exceeds the rate of release from the one chamber. This construction provides for both fast cycling of this continual quick service valve device and also that it is not operative in response to train brake pipe leakage up to the maximum amount allowable.

SUMMARY OF THE INVENTION

According to the present invention, a cycling-type continual quick service valve device embodies therein novel communication means for controlling the supply of fluid under pressure at unequal rates from a train brake pipe to each of a pair of chambers disposed on the respective opposite sides of an abutment that is directly connected to a stem that operates a first valve for releasing fluid under pressure from a first chamber at one side of the abutment and the train brake pipe to atmosphere and has a lost-motion connection with a second valve for releasing fluid under pressure from a second chamber at the other side of the abutment and a quick service chamber to atmosphere.

This novel communication means includes, for charging the second chamber at the other side of the abutment, a pair of chokes arranged in parallel and in series with a third choke there being a check valve device arranged in series with one of these parallel arranged chokes and opening in the direction of this second chamber thereby enabling flow of fluid under pressure from both the train brake pipe and the first chamber to this second chamber at a faster rate than it can flow from this second chamber to the train brake pipe upon effecting a subsequent reduction of pressure therein to cause operation of this novel continual quick service valve device to release fluid under pressure from the train brake pipe to atmosphere and thereby initiate propagation of a brake pipe pressure reduction wave from the vehicle provided with this valve device backward through a train and thus effect a more nearly simultaneous initiation of a service brake application on all vehicles in the train.

In the accompanying drawings

FIG. 1 is a diagrammatic view, partly in section, showing a brake control apparatus for a railway vehicle embodying the invention and comprising a brake control valve device, such as the well known "ABD" brake control valve device, and a novel cycling-type continual quick service valve device.

FIG. 2 is a partial sectional view of a prior art cycling-type continual quick service valve device, the remainder of this prior art continual quick service valve device being identical in construction to that of the continual quick service valve device shown in FIG. 1.

DESCRIPTION

Figure 3:
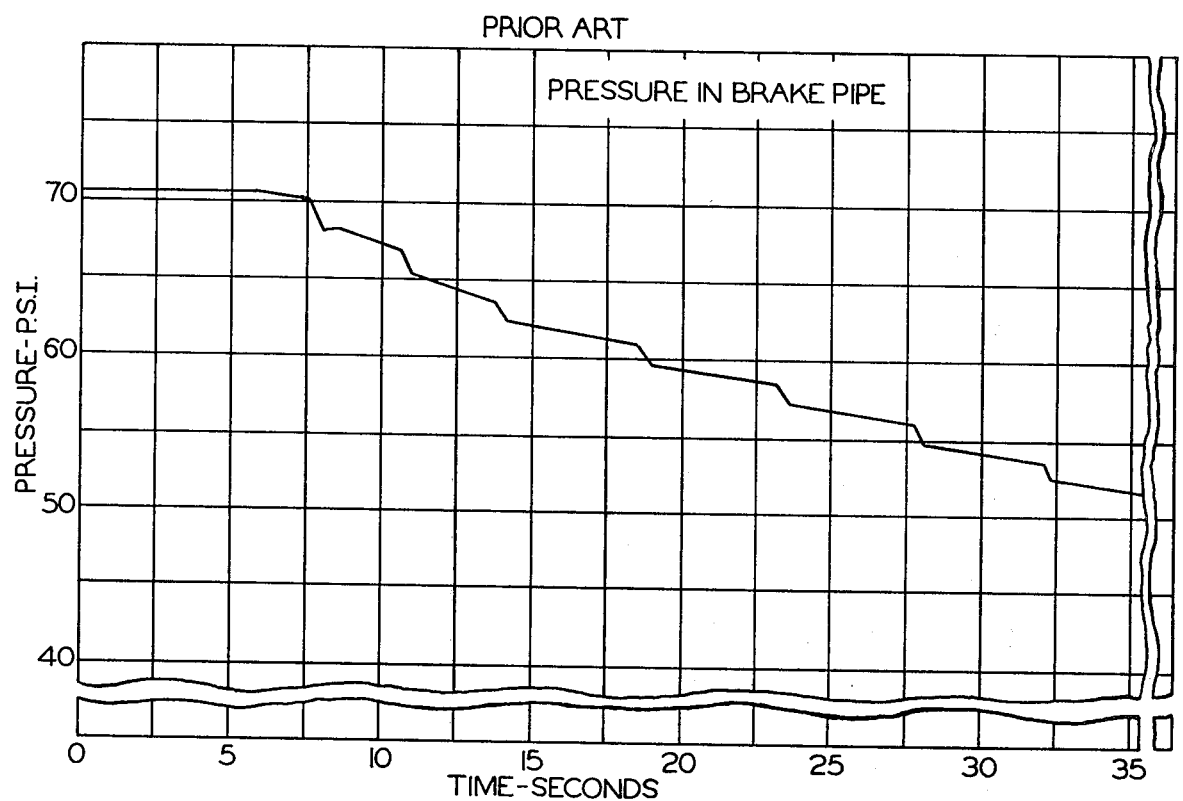
FIG. 3 shows a time-pressure diagram for a train brake pipe that is connected to a first chamber in the prior art cycling-type continual quick service valve device shown in FIG. 2.

Referring to FIG. 1 of the drawing, a railway vehicle fluid pressure brake control apparatus embodying the invention comprises a brake pipe 1, a first branch pipe 2, a brake control valve device 3, an auxiliary reservoir 4, an emergency reservoir 5, a brake cylinder device 6, a second branch pipe 7 and a cycling-type continual quick service valve device 8.

The brake control valve device 3 may be of the direct release type, such as the well known ABD brake control valve device which is fully described in U.S. Pat. No. 3,175,869 issued Mar. 30, 1965, to Walter B. Kirk and assigned to the assignee of the present application.

In view of the above-mentioned patent, it is deemed unnecessary to show and describe in detail the brake control valve device 3 and the brake cylinder device 6. It will, of course, be understood that the brake control device 3 operates upon a service reduction in brake pipe pressure to supply fluid under pressure to the brake cylinder device 6 to effect a service application of the brakes, upon an emergency reduction in brake pipe pressure to effect an emergency application of the brakes, and upon an increase in brake pipe pressure to effect the full release of the brakes and the charging of the brake equipment. It will also be understood that the brake cylinder device 6 is effective to apply to the wheels of a freight car a braking force proportional to the pressure of fluid supplied to said brake cylinder device by the brake control valve device 3.

The quick service valve device 8 comprises a pipe bracket portion 9 to which one end of the second branch pipe 7 is connected, the opposite end being connected to the outlet of a pipe tee 10 disposed in the brake pipe 1, and a quick service valve mechanism 11 secured to the pipe bracket portion 9 by any suitable means (not shown).

The pipe bracket portion 9 comprises a casing 12 that is provided on one side with a vertical bolting face 13 to which is secured by any suitable means (not shown) the quick service valve mechanism 11.

Extending from the vertical bolting face 13 of the casing 12 through the casing and opening at a flat surface 14 on the lower side of the casing and at right angles to the bolting face 13 is a port and passageway 15 to which the one end of the second branch pipe 7 is connected. Also opening at the surface of the vertical bolting face 13 and extending therefrom through the casing 12 and opening into an exhaust chamber 16 are two other ports and passageways 17 and 18. Opening into the exhaust chamber 16 is a screw-threaded bore 19 that extends from the exterior of the casing 12 into this exhaust chamber, and screw threaded into this screw-threaded bore is an insect excluder device 20 which is so constructed as to allow the free flow of fluid under pressure from the exhaust 16 to atmosphere and prevent the entrance of insects or dirt particles from the atmosphere into the exhaust chamber. Extending through the casing 12 and opening respectively at the vertical bolting face 13 and into a quick service chamber 21 formed in the casing 12 is a fourth passageway 22.

Furthermore, extending through the casing 12 and opening at each end at the vertical bolting face 13 is a fifth passageway 23 that has therein, at one end and adjacent the bolting face 13, a choke 24.

The passageways 17 and 18 in the casing 12 have respectively therein, adjacent the bolting face 13, chokes 25 and 26 which, respectively, control the rate at which fluid under pressure is vented from the brake pipe 1 to atmosphere, and the rate at which fluid pressure is vented from the quick service chamber 21 to atmosphere.

The quick service valve mechanism 11 comprises a casing 27 that is provided on one side thereof with a vertical bolting face 28 that corresponds to the bolting face 13 of the pipe bracket casing 12, in that opening at the surface of the bolting face 28 are ports corresponding to and registering with the ports 15, 17, 18, 22 and the ports at each end of the passageway 23, these ports being identically arranged therein and opening from corresponding passageways in the casing 27 so that when a gasket 29, provided with ports therein corresponding in number and arrangement to the ports opening at the respective surfaces of bolting faces 13 and 28, is placed between these two bolting faces and the casing 27 is rigidly secured to the casing 12 of the pipe bracket portion 9 by bolts or other similar means (not shown), the passageways 15, 17, 18, 22 and one end of the passageway 23 in the casing 12 extend into corresponding passageways in the casing 27.

The casing 27 also has opening at the surface of the bolting face 28 a screw-threaded counterbore 30 that is coaxial with a counterbore 31 that opens into a chamber 32 in which is contained a strainer device 33 which is inserted through the left-hand open end of the bore 31 prior to securing the strainer device 33 in place by a nut 34 that is screw threaded into the counterbore 30 and also prior to securing the casing 27 to the casing 12. Such a strainer device is described and claimed in U.S. Pat. No. 2,014,825, issued Sept. 17, 1935, to Ellis E. Hewitt, which patent is assigned to the assignee of the present application. Briefly, however, the strainer device comprises two concentric perforated tubular retainers having the space therebetween packed with hair or any other material suitable for separating dirt, moisture or the like from a stream of fluid under pressure. The inner surface of the smaller of the two concentric retainers defines a passageway which is open to the port and passageway 23 in the casing 12 through a passageway 35 in the nut 34. The passageway 15 that extends through the casings 12 and 27 opens into chamber 32.

The passageway 22 in the casing 27 has a branch passageway 22a that opens into a chamber 36 that is formed in the casing 27 below a flexible diaphragm 37 which is rigidly clamped about its periphery between the casing 27 and a cover member 38 which is secured to the casing 27 by any suitable means (not shown). The diaphragm 37 and the cover member 38 cooperate to form above the diaphragm a chamber 39 into which opens a passageway, the opposite end of which opens at the surface of the face of the cover member 38 that abuts the casing 27 in such a location as to be in alignment with the passageway 23 in the casing 27.

The diaphragm 37 has its inner periphery operatively connected to a valve stem 40 having at one end a flange that is clamped against a diaphragm follower 41 by a nut 42 that has screw-threaded engagement with corresponding screw threads formed on a stem 43 that is integral with the valve stem 40 and extends through a bore 44 formed in the diaphragm follower 41.

The valve stem 40 is slidably mounted in a bore 45 that is provided in the cover member 38 and extends from the chamber 39 through a chamber 46 formed in the cover member 38 to a chamber 47 formed by the cooperative relation of the cover member 38 and a threaded cap nut 48 that has screw-threaded engagement with a corresponding screw-threaded bore formed in the cover member 38 and extending from the exterior of the cover member into the chamber 47.

An O-ring 49 is carried in a peripheral annular groove formed in the valve stem 40 below a portion of reduced diameter that extends through the chamber 46 to a fluted portion of the valve stem 40 that is slidably mounted in that portion of the bore 45 that connects the chamber 46 to the chamber 47. An annular valve seat 50 is formed at the upper end of the bore 45 against which a flat disc valve 51, slidably disposed in a counterbore 52 formed in the cap nut 48, is normally biased by a spring 53 interposed between the flat disc valve 51 and the cap nut 48 to close communication between the chamber 47, which is connected to the chamber 39 above the diaphragm 37 via a passageway 54 formed in the cover member 38 and a choke 55 disposed in the passageway 54, and the chamber 46 into which opens one end of a passageway 56 in the cover member 38, the opposite end of which passageway opens at the surface of the cover member 38 that abuts the casing 27 and registers with one end of the passageway 17 in the casing 27.

To facilitate assembly and disassembly of the cap nut 48, spring 53 and flat disc valve 51 as a unit, the spring 53 and flat disc valve 51 are retained in the counter-bore 52 in the cap nut by a snap ring 57 that is inserted in a groove formed in the wall of the counterbore 52.

Formed in the casing 27 are two chambers 58 and 59 that are connected by a bore 60 that also connects the chamber 36 below the diaphragm 37 to the chamber 58. Opening into the chamber 58 is one end of the passageway 18 that extends through the casings 27 and 12 and opens at its opposite end into the exhaust chamber 16 so that the chamber 58 is constantly open to atmosphere via the passageway 18, choke 26 disposed in the passageway 18, exhaust chamber 16 and insect excluder device 20. Opening into the chamber 59 is one end of the passageway 22 that extends through the casings 27 and 12 and opens at its opposite end into the quick service chamber 21. Also opening into the chamber 59 is one end of a bore 61 that is coaxial with the bore 60 and opens at its other end into a chamber 62 formed by the cooperative relation of the casing 27 and a threaded cap nut 63 that has screw-threaded engagement with a corresponding screw-threaded bore formed in the casing 27 and extending from the exterior thereof into the chamber 62.

Formed at the lower end of the bore 61 is an annular valve seat 64 toward which a flat disc valve 65, slidably disposed in a counterbore 66 formed in the cap nut 63, is biased by a spring 67 interposed between the flat disc valve 65 and the cap nut 63.

The chamber 62 is connected via a passageway 68 having a choke 69 therein to the passageway defined by the inner surface of the smaller of the two concentric retainers of the strainer device 33 so that the chamber 62 is constantly supplied with fluid under pressure from the brake pipe 1 via pipe tee 10, branch pipe 7, passageway 15 in the casings 12 and 27, chamber 32, strainer device 33, choke 69 and passageway 68.

The diaphragm 37 is operatively connected by means of a lost-motion connection to a spool-type valve 70 that is slidably mounted in the bore 60 formed in the casing 27. The lost-motion connection is constituted by the upper end of the spool-type valve 70 which is of reduced diameter, being disposed in a bottomed bore 71 formed in the stem 43 and connected thereto by a pin 72 extending through a bore 73 of larger diameter than the pin 72, this bore 73 being formed in the upper end of the spool-type valve. The opposite ends of this pin 72 are respectively anchored in the stem 43.

The spool-type valve 70 has at its lower end a portion of reduced diameter that extends downward through the chamber 59 and the bore 61 so as to hold the flat disc valve 65 away from the annular valve seat 64 while the diaphragm 37 occupies the position in which it is shown in FIG. 1, in which position the diaphragm follower 41 abuts the casing 27.

Extending upward from the lower end of the spool-type valve 70 is a bottomed bore 74, the upper end of which is connected by a cross-drilled port to an elongated peripheral annular groove 75 provided intermediate the ends of the spool-type valve 70 and so located that the cross-drilled port opens into the chamber 58. Located on the spool valve 70 adjacent the respective opposite ends of the elongated groove 75 are two spaced-apart peripheral annular grooves in each of which is disposed an O-ring seal 76 which prevents flow of fluid under pressure from the chambers 36 and 59 to the chamber 58 which is constantly open to atmosphere via passageway 18, choke 26, exhaust chamber 16 and insect excluder device 20.

To facilitate assembly and disassembly of the cap nut 63, spring 67 and flat disc 65 as a unit, the spring 67 and valve 65 are retained in the counterbore 66 by a snap ring 77 that is inserted in a groove formed in the wall of the counterbore 66.

That portion of the structure of the cycling-type continual quick service valve device 8 shown in FIG. 1 and described above is identical with the prior art cycling-type continual quick service valve device shown in FIG. 2. Accordingly, like reference numerals have been used to designate the structure shown in FIG. 2 which is identical to that shown in FIG. 1. Moreover, that portion of the structure of each of these two continual quick service valve devices that is described above is substantially the same as the structure of the continual quick service valve device shown and described in U.S. Pat. No. 3,175,871 issued Mar. 30, 1965, to Richard L. Wilson and assigned to the assignee of the present application.

According to the present invention, the casing 27 of the cycling-type continual quick service valve device 8 shown in FIG. 1 of the drawings of the present application is further provided with a passageway 78 one end of which opens into the hereinbefore-mentioned passageway 15 in this casing 27, the opposite end of this passageway 78 being connected by a correspondingly numbered pipe to one end of a fixed resistance or choke 79.

Connected to the other end of the choke 79 is one end of a pipe 80 that has its other end connected to the inlet of a check valve 81. Connected to the outlet of this check valve 81 is one end of a pipe 82 the opposite end of which is connected to a correspondingly numbered passageway that extends through the casing 27 and opens into the chamber 62.

Accordingly, it is apparent from FIG. 1 of the drawings that the chokes 69 and 79 are arranged in parallel to provide for rapid charging of the chamber 62 and, therefore, the chambers 21 and 36 connected thereto via the bore 61, chamber 59, passageway 22 and branch passageway 22a, and that the check valve 81 prevents backflow of fluid under pressure from these chambers 21 and 36 to the brake pipe 1 via the choke 79.

In order to prevent undesired operation of both the continual quick service valve device 8 shown in the FIG. 1 of the drawings and the prior art continual quick service valve device shown in FIG. 2 in response to such as, for example, brake pipe leakage not exceeding the maximum allowable leakage of five pounds per square inch in one minute, while the upper side of the valve 65 abuts both an inner valve seat 83 formed on the lower end of the spool valve 70 and the outer valve seat 64 formed on the casing 27 at the lower end of the bore 61, the casing 27 of each of these continual quick service valve devices is provided with a restricted passageway or choke 84 that is of such size as to enable, while the valve 65 is seated on both the outer valve seat 64 and the inner valve seat 83, backflow of fluid under pressure from the chambers 21 and 36 to the brake pipe 1 via branch passageway 22a, passageway 22, chamber 59, bore 61, this restricted passageway 84, chamber 62, passageway 68, choke 69, strainer device 33, chamber 32, passageway 15, and the second branch pipe 7 simultaneously as fluid under pressure flows from the chamber 39 to the brake pipe 1 via passageway 23, choke 24, passageway 35, strainer device 33, chamber 32, passageway 15 and the second branch pipe 7. It will be understood that the size of the choke 69 relative to that of the choke 24 is such that when such limited simultaneous backflow from the chambers 21, 36 and 39 to the brake pipe 1 via these chokes occurs, the resulting differential fluid pressure force acting upward on the diaphragm 37 is not of sufficient magnitude to cause unseating of the valve 51 from its seat 50 against the yielding resistance of the spring 53.

OPERATION INITIAL CHARGING

Prior to coupling a railway vehicle provided with the apparatus shown in FIG. 1 of the drawings into a train, chambers 21, 32, 36, 39, 46, 47, 58, 59 and 62 are all void of fluid under pressure or, in other words, are at atmospheric pressure. With atmospheric pressure present in the chambers 36 and 39 on the respective opposite sides of the diaphragm 37, it is apparent that the spring 67 that is interposed between the cap nut 63 and the disc valve 65 will move this valve 54 together with the spool valve 70, stems 43 and 40 and the diaphragm follower 41 upward from the position in which they are shown in FIG. 1 until the valve 65 abuts or is stopped by the outer annular valve seat 64, it being noted that the inner annular valve seat 83 formed on the lower end of the spool-type valve 70 abuts the upper side of the disc valve 65 at this time. It should be further noted that the length of stem 40 is such that it does not unseat valve 51 from valve seat 50.

Let it be assumed that a railway freight car provided with the control valve device 3 and the quick service valve device 8, shown in FIG. 1 of the drawings, has been coupled into a train of cars, and that a handle of an engineer's brake valve device (not shown) located on the locomotive coupled to the head end of the train is in its "Release" position. Therefore, while the handle of the engineer's brake valve device is in its Release position, the engineer's brake valve device will effect the supply of fluid under pressure to the train brake pipe and therefore to the brake pipe 1 to charge the brake pipe to a preselected normal charge value which, for example, may be 70 pounds per square inch.

Fluid under pressure supplied to the brake pipe 1 will cause the brake control valve device 3 to operate in the usual well known manner to effect a release of the brakes on the car and to charge the auxiliary reservoir 4 and the emergency reservoir 5.

Fluid under pressure supplied to the brake pipe 1 will flow therefrom to the chamber 39 above the diaphragm 37 of the quick service valve device 8 via pipe tee 10, branch pipe 7, passageway 15, chamber 32, strainer device 33, passageways 35 and 23, and choke 24.

It being remembered that valve 65 is initially seated on valve seats 64 and 83 by the spring 67, as previously explained, it is apparent that some of the fluid under pressure supplied to the brake pipe 1 and thence to the chamber 32, as explained above, will flow from this chamber 32 to the chamber 36 below the diaphragm 37 via the strainer device 33, choke 69, passageway 68, chamber 62, restricted passageway 84, bore 61, chamber 59, passageway 22 and branch passageway 22a. Since one end of the passageway 22 opens into the quick service chamber 21, this chamber 21 will be charged simultaneously with the chamber 36.

It will be further noted that fluid under pressure will flow from the train brake pipe 1 to the chamber 62 in the valve device 8 via the pipe tee 10, branch pipe 7, passageway 15, passageway and pipe 78, choke 79, pipe 80, check valve 81, and pipe and passageway 82 from which chamber 62 fluid under pressure can flow to the chambers 21 and 36 via the pathway described above.

In view of the foregoing, it is apparent that the chambers 21 and 36 are charged with fluid under pressure from the brake pipe 1 via the chokes 69 and 79 arranged in parallel. However, the size of these chokes 69 and 79 are such that the charging capacity of these two chokes arranged in parallel and in series with the choke 84 is less than that of the choke 24. This insures that the chamber 39 is charged faster via the choke 24 than the chamber 36 is charged via the chokes 69 and 79 arranged in parallel and in series with the choke 84. Consequently, the pressure in the chamber 39 will quickly exceed that in the chamber 36 to establish a differential fluid pressure force on the diaphragm 37 that acts in a downward direction to deflect this diaphragm downward and thus move the stem 43 and spool valve 70 down in the position shown in FIG. 1 thereby unseating the disc valve 65, which abuts the inner valve seat 83 at the lower end of valve 70, from the outer valve seat 64.

With the disc valve 65 thus unseated from the valve seat 64 and seated on the valve seat 83, a first communication from the chamber 62 to the chamber 59 is established via the choke or restricted passageway 84 and the bore 61, and a second communication between those chambers is established past the unseated valve 65 and the bore 61.

With the disc valve 65 now unseated from valve seat 64 and seated on valve seat 83, as explained above, fluid under pressure supplied to the chamber 62 flows therefrom through restricted passageway 84 and also past unseated valve 65 to (1) the quick service chamber 21 via bore 61, chamber 59 and passageway 22 and (2) the chamber 36 below the diaphragm 37 via bore 61, chamber 59, passageway 22 and branch passageway 22a.

From the foregoing, it is apparent that the chambers 21 and 36 are charged from the brake pipe 1 via the chokes 69 and 79 arranged in parallel. Consequently, these chambers are charged faster through the two chokes 69 and 79 in parallel than would be the case if these chambers were charged only through the choke 69 as are the corresponding chambers in the prior art cycling-type continual quick service valve device shown in FIG. 2.

The sizes of the chokes 69 and 79 are such that, when arranged in parallel and disc valve 65 is unseated from seat 64, the charging capacity of these two chokes arranged in parallel is less than that of the choke 24. This insures that, subsequent to the unseating of valve 65 from seat 64, the chamber 39 above the diaphragm 37 may be supplied with fluid under pressure from the brake pipe 1 faster than the chamber 36 below this diaphragm so that the disc valve 65 is maintained unseated from the annular valve seat 64 during initial charging. However, when the chambers 39 and 36 are both fully charged to the hereinbefore-mentioned preselected normal charged value, it being understood that the chamber 36 is fully charged a slight interval of time after the chamber 39 is fully charged, the spring 67 is rendered effective to move the disc valve 65, spool valve 70, stem 43, diaphragm 37 and valve stem 40 upward until this valve 65 is moved into contact with the annular valve seat 64. With disc valve 65 seated on seats 64 and 83, a communication between chamber 59, to which chambers 21 and 36 are connected by passageways 22 and branch passageway 22a, and chamber 62 is provided by the bore 61 and restricted passageway or choke 84 to enable limited backflow of fluid under pressure from the chamber 36 to the brake pipe 1 thus preventing undesired operation of the quick service valve device 8 by train brake pipe leakage not exceeding the maximum allowable leakage of five pounds per square inch in one minute.

It will be understood that, as hereinbefore stated, the length of the valve stem 40 is such that the above-mentioned upward movement of the valve stem 40 by the spring 67 until the disc valve 65 is moved into seated contact with the outer annular valve seat 64 occurs without the upper end of this stem 40 unseating the flat disc valve 51 from its annular valve seat 50. Therefore, the spring 53 is effective to bias the flat disc valve 51 into contact with the valve seat 50 to close communication between the chambers 47 and 46. While the disc valve 51 is seated on the valve seat 50, the chamber 47 is charged from the chamber 39 to the hereinbefore-mentioned preselected normal charged value via the choke 55 and passageway 54. It will be understood that the chamber 39 is charged to this value by fluid under pressure supplied thereto from the brake pipe 1 via pipe tee 10, branch pipe 7, passageway 15, chamber 32, strainer device 33, passageways 35 and 23, and choke 24, the rate of charging of this chamber 39 being controlled by the size of the choke 24. It will be further understood that the rate of charging the chamber 47 is controlled by the sizes of the chokes 24 and 55 which are arranged in series between the brake pipe 1 and the chamber 47.

It will be noted that while the annular flat disc valve 51 is seated on the annular valve seat 50, the chamber 46 has a restricted communication with the atmosphere via passageway 56, passageway 17, choke 25, exhaust chamber 16 and insect excluder device 20. The chamber 58 also has a restricted communication with the atmosphere via passageway 18, choke 26, exhaust chamber 16 and insect excluder device 20.

FULL SERVICE APPLICATION OF BRAKES

Assume that the brake equipment shown in FIG. 1 of the drawings is the brake equipment on a freight car in a train of cars being hauled by a locomotive, and let it be supposed that the engineer desires to effect a full service brake application on the train.

To manually effect a full service application of brakes on a train, the engineer will move the handle of the engineer's brake valve device on the locomotive arcuately from its Release position to a "Full Service" position in a service zone.

When the handle of the engineer's brake valve device is moved to its Full Service position in the service zone, the brake valve device operates to vent fluid under pressure from the train brake pipe and therefore the brake pipe 1 to atmosphere at a service rate until the pressure in the train brake pipe is reduced to a corresponding degree.

As the pressure in the brake pipe 1 is reduced at a service rate, the brake control valve device 3 operates in the usual well known manner to effect an initial quick service reduction in brake pipe pressure and a full service brake application on the freight car on which brake control valve device 3 is installed. Also, as the pressure in the brake pipe 1 is reduced by flow therefrom to atmosphere via the train brake pipe and the engineer's brake valve device on the locomotive, fluid under pressure will flow at a restricted rate from the chamber 39 above the diaphragm 37 of the quick service valve device 8 to the brake pipe 1 via passageway 23, choke 24, passageway 35 in the nut 34, strainer device 33, chamber 32, passageway 15 and branch pipe 7 so that the pressure in the chamber 39 is reduced simultaneously as the pressure in the train brake pipe is reduced at a rate controlled by the size of the choke 24.

Furthermore, as the pressure in the brake pipe 1 is reduced by flow to atmosphere via the engineer's brake valve device, fluid under pressure will flow at a restricted rate determined by the size of the chokes 69 and 84 in series from the chamber 36 below the diaphragm 37 of the quick service valve device 8 and the quick service chamber 21 to the brake pipe 1 via branch passageway 22a, passageway 22, chamber 59, bore 61, restricted passageway or choke 84, chamber 62, passageway 68, choke 69, strainer device 33, chamber 32, passageway 15 and second branch pipe 7, it being noted that the check valve 81 prevents backflow through the choke 79 at this time. Since the size of the choke 69 is less than that of the choke 24, as hereinbefore-stated, fluid under pressure cannot flow from the chamber 36 via this choke 69 as fast as fluid under pressure can flow from the chamber 39 via the choke 24. Consequently, a differential fluid pressure force is established on the diaphragm 37 which deflects it in an upward direction to move the valve stem 40 upward with it.

The length of the stems 40 and 43, the diameters of the pin 72 and the bore 73 are such that when the stems 40 and 43 and pin 72 are moved upward by the diaphragm 37, the upper end of the stem 40 will be moved into contact with the lower side of the valve 51 prior to movement of the pin 72 into abutting contcat with the upper wall surface of the bore 73. For example, the length of the stems 40 and 43 and the diameters of the pin 72 and bore 73 may be so selected that when the upper end of the stem 40 abuts the lower side of the valve 51, the upper surface or top of the pin 72 is 0.014 inch below the wall surface of the bore 73.

Accordingly, as the diaphragm 37 is deflected upward, it will, through the intermediary of the valve stem 40, lift the valve 51 upward from the annular valve seat 50 first before the pin 72 is moved into contact with the wall surface of the bore 73. By unseating of the flat disc valve 51, fluid under pressure from the brake pipe 1, which is present in the chamber 47 is permitted to flow to atmosphere at a restricted rate determined by the size of the chokes 24, 55 and 25 in series via the bore 45, chamber 46, passageways 56 and 17, choke 25, exhaust chamber 16 and insect excluder device 20.

As the pressure in the chamber 39 is reduced faster than the pressure in the chamber 36, the higher pressure in the chamber 36 below the diaphragm 37 and in the quick service chamber 21, since the flat disc valve 65 is now seated on the annular valve seat 64 and also on an annular valve seat 83 formed on the lower end of spool type valve 69 at the lower end of counterbore 73 therein, is effective to increase the differential of pressure on the diaphragm 37 which deflects it further in an upward direction, and thereby through the intermediary of the valve stem 40 moves the flat disc valve 51 further upward against the yielding resistance of the spring 53 away from from the annular valve seat 50. As the flat disc valve 51 is thus shifted away from its seat 50, fluid under pressure from the brake pipe which is present in the chambers 47 and 39 is permitted to flow to atmosphere at a restricted rate determined by the size of chokes 24, 55 and 25 via bore 45, chamber 46, passageways 56 and 17, choke 25, exhaust chamber 16 and insect excluder device 20. The sizes of the chokes 24, 55 and 25 are such as to prevent the pressure in the brake pipe 1 being reduced at an ermergency rate. Consequently, an emergency brake application is avoided.

This further reduction of the pressure in the chamber 39 above the diaphragm 37 caused by flow of fluid under pressure from this chamber 39 to atmosphere via the chokes 55 and 25, in addition to the flow of fluid under pressure from this chamber to atmosphere via the passageway 23, choke 24, passageway 35, strainer device 33, chamber 32, passageway 15, second branch passageway 7, train brake pipe 1, and the engineer's brake valve device now in its Full Service position, will cause the pressure in the chamber 39 to be reduced to a value below that in the chamber 36, it being remembered that fluid under pressure is being released from this chamber 36 via the chokes 84 and 69 in series and the engineer's brake valve device at a rate determined by the size of these chokes. In other words, upon the valve 51 being unseated from its seat 50, fluid under pressure flows from the chamber 39 to atmosphere via the chokes 55 and 25 in series and the insect excluder device 20, and also from this chamber 39 to atmosphere via the choke 24 and the engineer's brake valve device, now in Full Service position, whereas fluid under pressure at this time flows from the chamber 36 to atmosphere via the chokes 84 and 69 in series, the size of the choke 69 being less than that of the choke 24, as aforestated, and the engineer's brake valve device. Thus, subsequent to the unseating of the valve 51 from its seat 50, the differential fluid pressure scting in an upward direction on the diaphragm 37 is further increased so that the higher pressure in the chamber 36 below this diaphragm 37 deflects it further upward against the yielding resistance of the spring 53 thereby moving valve 51 further away from its seat 50, since, as previously stated, the upper end of the valve stem 40 is in contcat with the bottom of this flat disc valve 51.

As the diaphragm 37 is thus deflected upward, the stem 43 and pin 72 carried thereby are likewise moved upward. The size of the bore 73 is such that the valve 51 is unseated from its seat just before the pin 72 is moved into contact with the upper wall surface of the bore 73 in spool valve 70. As diaphragm 37 is further deflected upward, subsequent to unseating of the valve 51, by the increased differential fluid presure force acting on this diaphragm 37 in an upward direction as the result of unseating the valve 51, the pin 72 is quickly moved into contact with the upper wall surface of the bore 73 in the spool-type valve 70 so that subsequent upward movement of the stem 43 and pin 72 by the upward deflection of the diaphragm 37 is effective to move this valve 70 upward so that the annular valve seat 83 formed on the lower end of this valve 70 will be lifted upward from the flat disc valve 65 which is biased against the outer annular valve seat 64 by the spring 67.

When the annular valve seat 83 is lifted upward from the flat disc valve 65, fluid under pressure present in the chamber 36 and the quick service chamber 21 connected thereto by the passageway 22 and branch passageway 22a flows to atmosphere via the passageway 22, chamber 59, bore 61, past the unseated annular valve seat 83 and thence via the bottomed bore 74, chamber 58, passageway 18 and choke 26 disposed therein, exhaust chamber 16 and insect excluder device 20 at a rate controlled by the size of the choke 26.

It will be noted that at this time fluid under pressure may flow from the train brake pipe 1 to the chamber 39 above the diaphragm 37 via the choke 24, and also from this train brake pipe 1 to the chamber 36 below this diaphragm 37 via the chokes 69 and 79 in parallel and thence via the choke or restricted passageway 84 which is in series with these two parallel arranged chokes 69 and 79, it being remembered that the size of chokes 69, 79 and 84 are such that fluid under pressure may flow from the brake pipe 1 to the chamber 39 faster than to the chamber 36. In other words, upon a reduction of the pressure in these chambers 39 and 36, the quantity of fluid under pressure per unit of time that may be supplied from the brake pipe 1 to the chamber 39 is greater than the quantity of fluid under pressure that may be supplied from the brake pipe 1 to the chambers 36 and 21. The effect of this is that the volume of the chamber 39 is greater than that of the combined volumes of the chambers 21 and 36.

It is well known that when fluid uner pressure is released from a small volume to atmosphere via a choke, the pressure in this small volume will reduce faster than will the pressure in a large volume when the fluid under pressure in the large volume is released to atmosphere via a choke of substantially the same size.

In view of the above, it is apparent that the pressure in the smaller volume comprising the chambers 21 and 36 will reduce faster by flow to atmosphere via the choke 26 than will the pressure in the larger volume comprising the chamber 39 by flow to atmosphere via chokes 55 and 25 in series. Therefore, fluid under pressure will thus be vented from the quick service chamber 21 and the chamber 36 below the diaphragm 37 until the pressure in the chamber 36 is reduced below that in the chamber 39 above this diaphragm.

Upon the pressure in the chamber 36 being thus reduced below that of the pressure in chamber 39, a differential fluid pressure force is established on the diaphragm 37 which acts in the direction to deflect this diaphragm 37 downward. Also, the spring 53 transmits a force to the stems 40 and 43 via the disc valve 51, it being apparent from FIG. 1 of the drawings that this force acts in a downward direction to assist in deflecting the diaphragm 37 in a downward direction.

It will be noted that as the diaphragm 37 is now initially deflected in a downward direction, the valve stems 40 and 43 are moved downward with it thereby rendering the spring 53 effective to move the disc valve 51 downward and maintaining it in abutting relationship with the upper end of the valve stem 40 but unseated from seat 50. However, this initial downward movement of the valve stem 43 is relative to the spool valve 70 for the reason that the diameter of the bore 73 is greater than the diameter of the pin 72. Therefore, while the diaphragm 37 is being deflected downward to move the stem 43 and pin 72 downard relative to the spool valve 70 from the position in which the pin 72 abuts the upper wall surface of the bore 73 to the position in which the lower end of the stem 43 abuts the spool valve 70, fluid under pressure is being released from the chambers 36 and 21 via the choke 26 faster than fluid under pressure is being released from the chamber 39 to atmosphere via the chokes 55 and 25 and the unseated valve 51. This further increases the differential fluid pressure force acting in a downward direction on the diaphragm 37. Consequently, after the stem 43 has been moved downward far enough for its lower end to abut the spool valve 70, the still increasing differential fluid pressure force acting in a downward direction on the diaphragm 37 causes further downward deflection of this diaphragm 37 to move the stems 40 and 43 and the spool valve 70 downward until the spring 53 moves the valve 51 into seating contact with its seat 50 and thereafter, upon further downward deflection of the diaphragm 37, to move the valve seat 83 on the lower end of the spool valve 70 into contact with the disc valve 65 which is biased by the spring 67 against the outer annular valve seat 64 at this time.

It will be noted that by reason of the lost-motion connection provided by the pin 72 between the stem 43 and the spool-type valve 70, the above-mentioned initial downward movement of the valve stems 40 and 43 is relative to this valve 70 which remains stationary, it being understood that the O-ring seals 76 provide enough friction with the wall of the bore 60 to prevent this valve 70 from being moved downward by gravity.

It is apparent from the above that as the differential fluid pressure force acting in a downward direction on the diaphragm 37 increases, this diaphragm 37 is deflected downward so that the stems 40 and 43 are moved downward thereby thus rendering the spring 53 effective to seat valve 51 on its seat 50 to cut off flow of fluid under pressure from the brake pipe 1 and chambers 39 and 47 to atmosphere. Further downward deflection of the diaphragm 37, subsequent to the seating of the disc valve 51 on its seat 50, moves the spool valve 70 downward until the valve seat 83 on the lower end of this valve 70 is moved into contact with the disc valve 65, it being noted that the seating of valve 51 on seat 50 and movement of valve seat 83 into contact with the disc valve 65 occur sequentially by reason of the fact, as hereinbefore-stated, the length of the stems 40 and 43 and the diameters of the pin 72 and bore 73 may be so selected that when the upper end of the stem 40 abuts the lower side of the valve 51, the upper surface or top of the pin 72 is, for example, 0.014 inch below the wall surface of the bore 73.

Moreover, it is apparent that (1) seating of the valve 50 on its seat 51 prevents further flow of fluid under pressure from the chamber 39 and the brake pipe 1 connected thereto via the choke 24 to atmosphere via the chokes 55 and 25 in series, and (2) movement of the valve seat 83 on the lower end of the spool valve 70 into contact with the disc valve 65 prevents further flow of fluid under pressure from the chambers 21 and 36 to atmosphere via the choke 26.

Furthermore, it should be noted from the foregoing that at the same time the valve 50 is seated on its seat 51 by the spring 53, and the valve seat 83 on the lower end of the spool valve 70 is subsequently moved into contact with the disc valve 65, the reduced pressure in the chamber 39 is higher than that reduced pressure in the chamber 36.

Since the pressure of the fluid in the chamber 39 is now higher than the pressure in the chamber 36, it is apparent that the difference in the pressure of the fluid in these chambers establish a differential fluid pressure force on the diaphragm 37 which acts thereon in a downward direction.

It should be further noted that so long as the pressure in the chamber 39 above the diaphragm 37 is higher than the pressure in the chamber 36 below this diaphragm, fluid under pressure can flow from the chamber 39 to the chambers 21 and 36 via passageway 23, choke 24, passageway 35, strainer device 33, choke 69, passageway 68, chamber 62, restricted passageway or choke 84, bore 61, chamber 59, passageway 22 and branch passageway 22a.

Furthermore, fluid under pressure can flow from the strainer device 33 to the chamber 62 via chamber 32, passageway 15, passageway and pipe 78, choke 79, pipe 80, check valve 81, and pipe and passageway 82.

Accordingly, it is apparent that the chokes 69 and 79 arranged in parallel and these two parallel arranged chokes in series with the choke 84 provide for flow of fluid under pressure from the chamber 39 to the chamber 36 until substantial equalization of pressures therebetween occurs thereby eliminating the above-mentioned differential fluid pressure force on the diaphragm 37.

It will be noted that subsequent to the above-described equalization of pressure in the chambers 39 and 36 by flow from the chamber 39 to the chamber 36 and prior to operation of the engineer's brake valve device to its lap position to cut off flow from the train brake pipe to atmosphere via this brake valve device, fluid under pressure will continue to flow at a restricted rate from the chamber 39 above the diaphragm 37 to atmosphere via passageway 23, choke 34, passageway 35, strainer device 33, chamber 32, passageway 15, second branch pipe 7, train brake pipe 1 and the brake valve device at a rate controlled by the size of the choke 24.

Simultaneously, fluid under pressure will continue to flow from the chamber 36 below the diaphragm 37 to atmosphere via branch passageway 22a, passageway 22, chamber 59, bore 61, restricted passageway or choke 84, chamber 62, passageway 68, choke 69, strainer device 33, chamber 32, passageway 15, second branch pipe 7, train brake pipe 1 and the brake valve device at a rate controlled by the size of the choke 69 which, as aforestated, is smaller than the choke 24. Consequently, a differential fluid pressure force is quickly established on the diaphragm 37 which deflects it in an upward direction to cause the cycling-type continual quick service valve device 8 to repeat the cycle described above.

Accordingly, the cycling-type continual quick service valve device 8 will continue to repeat the above-described cycle to locally release fluid under pressure from the train brake pipe 1 to atmosphere via the insect excluder device 20 during each cycle until the engineer's brake valve device is moved to its lap position to discontinue the release of fluid under pressure from the chambers 39 and 36 via the train brake pipe and engineer's brake valve device on the locomotive. Since it was assumed that the handle of the engineer's brake valve device was moved to its Full Service position, it will be understood that this engineer's brake valve device is moved to its lap position upon the pressure in the train brake pipe being reduced a chosen amount which, if, for example, the normal charged train brake pipe pressure is 70 pounds per square inch, is 20 pounds per square inch. Thus, while the pressure in the train brake pipe is being reduced a chosen amount via the engineer's brake valve device prior to its movement to its lap position, the cycling-type continual quick service valve device 8 shown in FIG. 1 completes a number of repeated identical cycles, the operation of this valve device 8 upon each of its several cycles being effective to locally release fluid under pressure from the train brake pipe 1 to atmosphere via the insect excluder device 20 of this valve device 8. Consequently, this cycling-type continual quick service valve device 8, by operating in cooperation with the engineer's brake valve device, causes the pressure in the train brake pipe to be reduced more rapidly than would be the case if fluid under pressure were released from the train brake pipe to atmosphere only via the engineer's brake valve device on the locomotive.

The advantages of the brake control apparatus shown in FIG. 1 of the present application wherein the choke 79 and check valve 81 are arranged in parallel relationship with the choke 69, as provided by the present invention, in the cyclingtype continual quick service valve device 8 over a brake control apparatus embodying the prior art cycling-type continual quick service valve device shown in FIG. 2 may be best understood by reference to FIGS. 3, 4, 5, and 6 of the drawings of the present application.

FIG. 3 shows a time-pressure diagram for a brake pipe that is connected to the chamber 39 above the diaphragm 37 of the prior art cycling-type continual quick service valve device 8 constructed as shown in FIG. 2.

Figure 4:
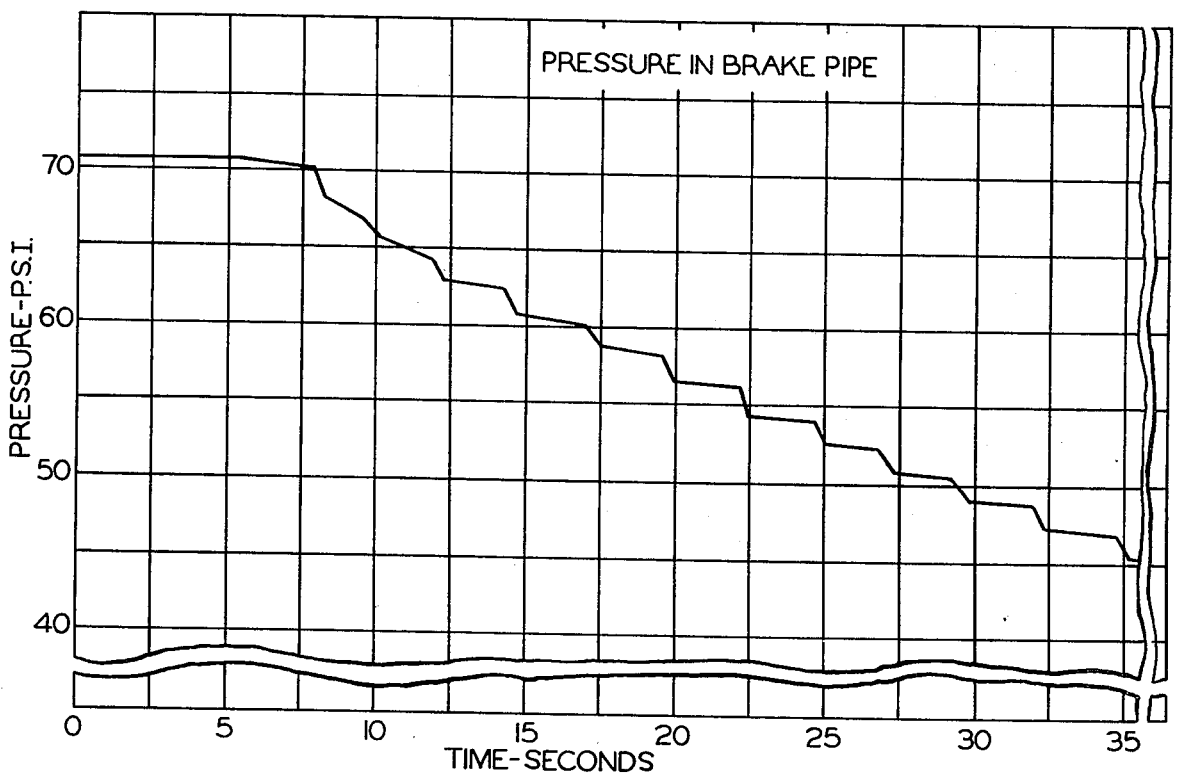
FIG. 4 shows a time-pressure diagram for a train brake pipe that is connected to a corresponding first chamber in the cycling-type continual quick service valve device shown in FIG. 1 and constituting the present invention.

FIG. 4 shows a time-pressure diagram for a brake pipe that is connected to the corresponding chamber 39 above the diaphragm 37 of the cycling-type continual quick service valve device 8 shown in FIG. 1 of the drawings of the present application which device 8 in combination with the choke 79 and check valve 81 constitutes the present invention.

Figure 5:
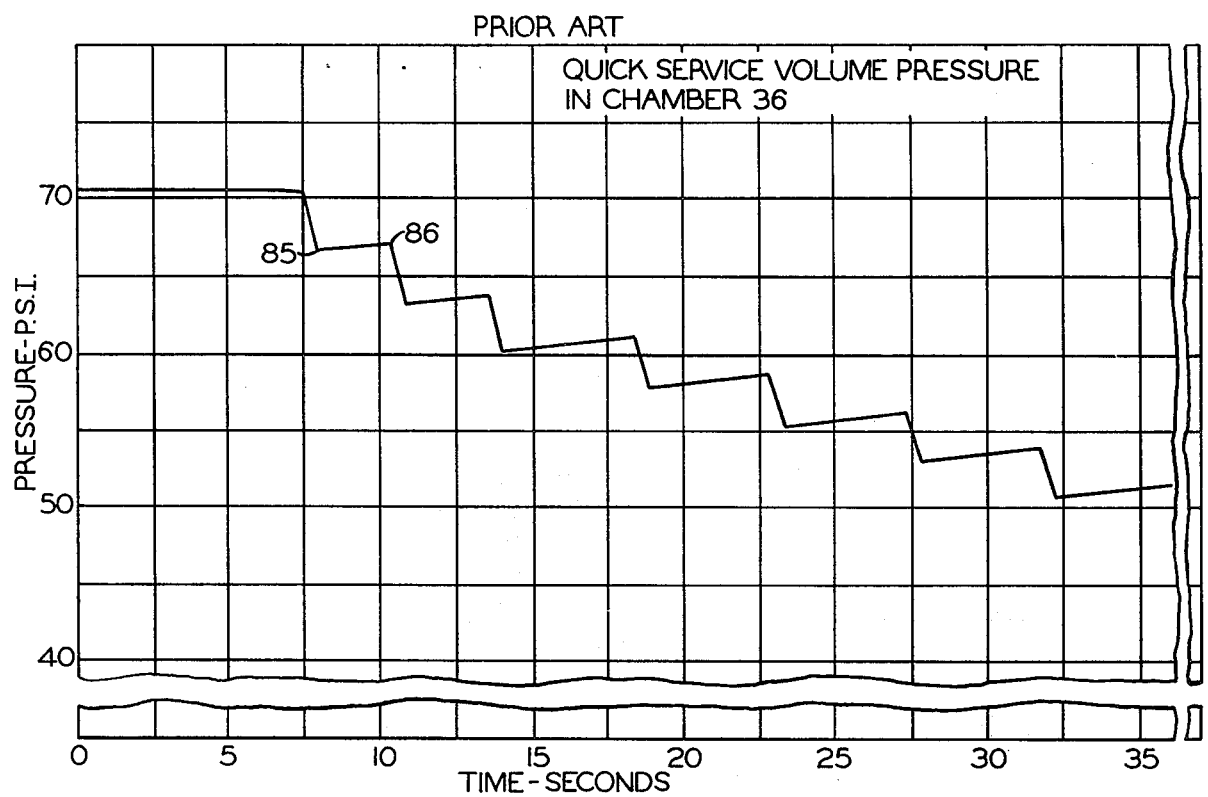
FIG. 5 shows a time-pressure diagram for a second chamber in the prior art cycling-type continual quick service valve device shown in FIG. 2 which chamber is connected to a quick service volume.

FIG. 5 shows a time-pressure diagram for the chamber 36 below the diaphragm 37 of the prior art cycling-type continual quick service valve device shown in FIG. 2.

Figure 6:
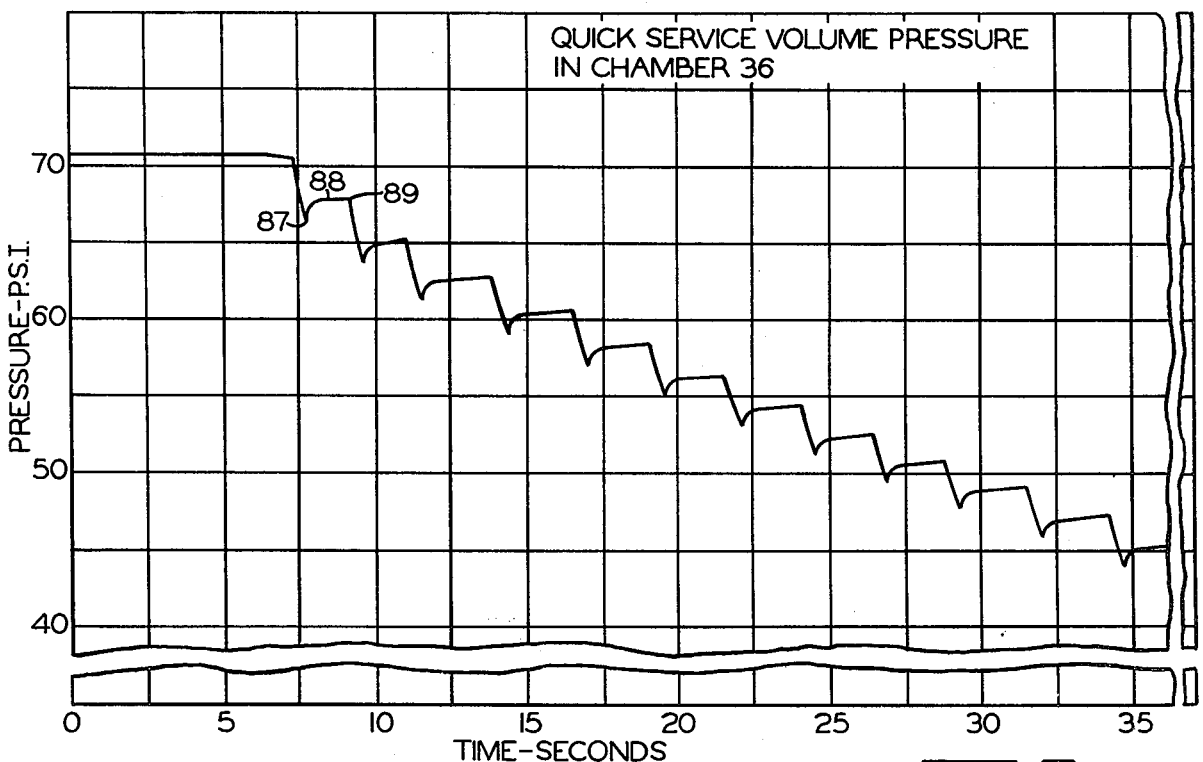
FIG. 6 shows a time-pressure diagram for a corresponding second chamber in the cycling-type continual quick service valve device shown in FIG. 1 and constituting the present invention which chamber is connected to a quick service volume.

FIG. 6 shows a time-pressure diagram for the chamber 36 below the diaphragm 37 of the cycling-type continual quick service valve device 8 shown in FIG. 1 of the drawings of the present application.

It will be understood that these pressure-time diagrams shown for both the prior art cycling-type continual quick service valve device constructed as shown in FIG. 2 and the cycling-type continual quick service valve device 8 in combination with the choke 79 and check valve 81 as shown in FIG. 1 disclosing the present invention, were obtained by using identical manually operable valve devices to release fluid under pressure at a service rate from the brake pipe 1 connected to each of these continual quick service valve devices.

Accordingly, it may be seen from FIGS. 3 and 4 of the drawings that, upon manual movement of an operating handle of the respective manually operable valve device to the position for effecting a release of fluid under pressure from the brake pipe 1 connected to the respective continual quick service valve device at a service rate, the pressure in each respective brake pipe 1 began to reduce at a slow rate after a period of time of approximately 5.5 seconds.

It will be further noted from FIGS. 3 and 4 of the drawings that, after a period of time of approximately 7.5 seconds, the pressure in the respective brake pipe had reduced at a slow rate from a value of approximately 70.5 pounds per square inch to a value of approximately 70.0 pounds per square inch.

It will be understood that this slow rate of reduction of pressure in each brake pipe is effected by the release of fluid under pressure from each brake pipe to atmosphere via the manually operable valve device connected to the respective brake pipe.

Furthermore, it will be noted from FIGS. 3 and 4 that, subsequent to this period of time of approximately 7.5 seconds, the pressure in each brake pipe 1 began to reduce rapidly. It should be understood that this rapid reduction of pressure in the respective brake pipe 1 was brought about by the unseating of the valve 51 in each of these continual quick service valve devices from its corresponding seat 50.

Moreover, it will be noted from FIGS. 3 and 4 that, subsequent to unseating of the valve 51 in each valve device 8 and after a total period of time of approximately 8 seconds, the pressure in each brake pipe 1 had been reduced to approximately 68 pounds per square inch.

Now referring to FIGS. 5 and 6 of the drawings, it will be noted that after a period of time of approximately 6 seconds, the pressure in the chamber 36 of the respective continual quick service valve device began to reduce at a slow rate, it being understood that this initial slow rate of reduction of pressure was brought about by flow from the chamber 36 of the respective continual quick service valve device 8 to atmosphere via the manually operable valve device connected to the corresponding brake pipe 1.

It will be further noted from FIGS. 5 and 6 of the drawings that after a period of time of approximately 7.5 seconds, the pressure in the chamber 36 of the respective continual quick service valve device had reduced to a value of approximately 70 pounds per square inch and that subsequent to this period of time of approximately 7.5 seconds, the pressure in each of the chambers 36 began to reduce rapidly. It should be understood that this rapid reduction of pressure in the respective chamber 36 was brought about by the unseating of the corresponding valve seat 83 from the disc valve 65 which unseating is effective to release fluid under pressure from the chamber 36 to atmosphere via the corresponding choke 26.

Moreover, it will be noted from FIGS. 5 and 6 that after a total period of time of approximately 8 seconds, the pressure in the chamber 36 in each of the continual quick service valve devices had reduced to approximately 66.5 pounds per square inch.

The above-mentioned release of fluid under pressure from the chamber 36 in each of the continual quick service valve devices causes, in the manner hereinbefore explained, the corresponding valve 51 to be seated on seat 50 and thereafter valve seat 83 to be moved downward until this valve seat 83 is moved into contact with the corresponding disc valve 65 to thereby terminate the release of fluid under pressure from the corresponding chambers 39 and 36 and quick service chamber 21 to atmosphere after a total period of time of approximately 8 seconds.

It is apparent that up to this point, the performance of the two cycling-type continual quick service valve devices is substantially the same.

Subsequent to terminating the release of fluid under pressure from the chamber 36 and the quick service chamber 21 in the prior art cycling-type continual quick service valve device 8 shown in FIG. 2 to atmosphere, the fluid in the chamber 39 in this valve device 8, which is at a higher pressure than that in the chamber 36, will flow to this chamber 36 via passageway 23, choke 24, passageway 35, strainer device 33, choke 69, passageway 68, chamber 62, choke 84, bore 61, chamber 59, passageway 22 and branch passageway 22a. Thus, fluid under pressure begins to flow from the champer 39 to the chamber 36 in this prior art cycling-type continual quick service valve device via the chokes 24, 69 and 84 in series.

However, since the pressure in the chamber 39 is higher than the pressure in the chamber 36, this difference in pressure in these two chambers establishes a fluid pressure force that acts downward on the diaphragm 37 to deflect it in a downward direction. This downward deflection of the diaphragm 37 is effective to move stem 43 and spool valve 70 downward so that the valve seat 83 on the lower end of this spool valve 70 is effective to unseat valve 65 from outer valve seat 64. Upon unseating of valve 65 from this seat 64, fluid under pressure present in the chamber 62 may flow past the unseated valve 65 to the interior of the bore 61 as well as through the choke 84 to the interior of this bore 61. Consequently, subsequent to unseating of the valve 65 from the seat 64, flow of fluid under pressure from the chamber 39 to the chamber 36 is via the two chokes 24 and 69 in series until equalization of the pressures in these chambers 39, 21 and 36 occurs.

It should be noted from FIG. 5 of the drawings that this flow of fluid under pressure from the chamber 39 to the chamber 36 begins after a total time of approximately 8.0 seconds and continues to a total time of approximately 10.5 seconds and increases the pressure in this chamber 36 from approximately 66.5 pounds per square inch to approximately 67.25 pounds per square inch. In other words, this equalization of pressure in the chambers 39 and 36 causes the pressure in the chamber 36 to increase 0.75 pounds per square inch in a period of time of 2.5 seconds by the flow of fluid under pressure from the chamber 39 to this chamber 36.

It will be remembered that the manually operable valve device connected to the brake pipe 1 is still in the position to continue the venting of fluid under pressure from the brake pipe 1 to atmosphere at a service rate of reduction of the pressure in this brake pipe.

Therefore, it will be noted from FIGS. 3 and 5 of the drawings that after a total period of time of 10.5 seconds, the pressure in the brake pipe 1 and the chambers 39 and 36 is approximately 67.25 pounds per square inch.

Consequently, it being remebered that the chamber 39 is connected to the brake pipe 1 via the choke 24 and the chamber 36 is connected to this pipe 1 via the choke 69, the continuing reduction of the pressure in the brake pipe 1 by the release of fluid under pressure therefrom to atmosphere, and, therefore, from these chambers 39 and 36, will cause the prior art continual quick service valve device shown in FIG. 2 to operate to sequentially repeat the above described cycle so long as the manually operable valve device connected to the brake pipe 1 of this prior art valve device is effective to continue the venting of fluid under pressure from this brake pipe 1 to atmosphere at a service rate.

Accordingly, it may be seen from FIGS. 3 and 5 that after a total period of time of approximately 35 seconds this prior art cycling-type continual quick service valve device has performed seven cycles to locally release fluid under pressure from the brake pipe to atmosphere, it being noted from FIG. 3 that the pressure in the brake pipe has been reduced from the hereinbefore-mentioned pressure of 70.5 pounds per square inch to approximately 52 pounds per square inch.

Referring now to FIG. 5, it will be noted that subsequent to seating of valve 51 on its seat 50 and seating of valve seat 83 on disc valve 65 to terminate release of fluid under pressure from the respective chambers 39 and 36 to atmosphere during each cycle, the pressure in the chamber 36 is increased approximately 0.75 square inch by flow of fluid under pressure from the chamber 39 to this chamber 36 via chokes 24 and 69 in series to cause equalization of pressure between these chambers.

Considering now the novel brake apparatus shown in FIG. 1, subsequent to terminating the release of fluid under pressure from the chamber 36 and the quick service chamber 21 in applicant's continual quick service valve device 8 to atmosphere, the fluid in the chamber 39, which is at a higher pressure than that in the chamber 36, as hereinbefore explained in connection with the prior art continual quick service valve device, will flow from this chamber 39 above the diaphragm 37 to the chamber 36 therebelow and to the quick action chamber 21 via passageway 23, choke 24, passageway 35, strainer device 33, choke 69, passageway 68, chamber 62, choke 84, bore 61, chamber 59, passageway 22 and branch passageway 22a.

Moreover, fluid under pressure will flow from the interior of the strainer device 33 to the chamber 32 and thence to the chamber 62 via passageway 15, passageway and pipe 78, choke 79, pipe 80, check valve 81 and pipe and passageway 82. Thus, the flow to chamber 62 is via chokes 69 and 79 in parallel.

The higher pressure in the chamber 39 deflects diaphragm 37 downward to unseat valve 65 from the outer valve seat 64 in the same manner as hereinbefore explained for the prior art continual quick service valve device. Consequently, subsequent to the unseating of valve 65 from outer valve seat 64, fluid under pressure will flow from the chamber 39 to the chamber 62 via the choke 24 and thence through the chokes 69 and 79 arranged in parallel. The fluid under pressure thus supplied to the chamber 62 will flow therefrom to the chamber 36 and quick service chamber 21 past the valve 65, which is unseated from seat 64, and thence through bore 61, chamber 59, passageway 22 and branch passageway 22a until equalization of pressure in chambers 39, 21 and 36 occurs.

The advantage of arranging choke 79 in parallel with choke 69 as provided by the present invention is made apparent by a comparison of FIGS. 5 and 6.

Considering the prior art cycling-type continual quick service valve device, FIG. 5 of the drawing shows that, for the first cycle, the flow of fluid under pressure from the chamber 39 to the chamber 36 via the chokes 24 and 69 in series until equalization of pressure in these chambers occurs, increases the pressure in the chamber 36 approximatley 0.75 pounds per square inch, this increase being represented by the line extending from the numeral 85 to the numeral 86, it being noted that this increase in pressure occurred in approximately 2.5 seconds.

It may be noted that FIG. 5 further shows that the increase in the pressure in the chamber 36, as the result of the flow of fluid under pressure thereto from the chamber 39, is approximately the same for each of the several sequentially repeated cycles.

Now considering the novel brake apparatus shown in FIG. 1 of the drawings, FIG. 6 shows that, for the first cycle of the continual quick service valve device 8, the flow of fluid under pressure from the chamber 39 to the chamber 36 of this device, via the choke 24 in series with the two chokes 69 and 79 arranged in parallel, until equalization of pressure in these chambers occurs, increases the pressure in the chamber 36 very rapidly from a pressure of approximately 66.5 pounds per square inch to a pressure of approximately 67.5 pounds per square inch in approximately 0.25 seconds, this increase being represented in FIG. 6 by the line extending from the numeral 87 to the numeral 88.

Furthermore, FIG. 6 shows that thereafter the pressure in the chamber 36 increases slowly from 67.5 pounds per square inch to approximately 67.75 pounds per square inch in approximately 1.2 seconds, this increase being represented in FIG. 6 by the line extending from the numeral 88 to the numeral 89.

By a comparison of FIGS. 5 and 6, it will be noted that the time required for equalization of pressure in the chambers 39 and 36 of the prior art cycling-type continual quick service valve device as represented by the line extending between the numerals 85 and 86 in FIG. 5 is approximately 2.5 seconds whereas the time required for equalization of pressure in the chambers 39 and 36 of the novel brake apparatus shown in FIG. 1 and constituting the present invention as represented by the line extending between the numerals 87 and 89 in FIG. 6 is approximately 1.5 seconds.

Accordingly, it is apparent that the time required for the novel brake apparatus shown in FIG. 1 to complete one cycle is appreciably less than that required for the prior art cycling-type continual quick service valve device shown in FIG. 2 to complete one cycle. Therefore, the novel brake apparatus shown in FIG. 1 is effective to complete more cycles in any given period of time than the prior art device shown in FIG. 2.

Consequently, it may be seen from FIG. 5 that in a period of time of approximately 35 seconds, the prior art continual quick service valve device shown in FIG. 2 is effective to complete seven cycles and reduce the pressure in the chamber 36, and likewise in the brake pipe, as illustrated by FIG. 3, from 70.5 pounds per square inch to approximately 52 pounds per square inch, whereas it may be seen from FIG. 6 that in the same period of time of approximately 35 seconds the novel brake apparatus shown in FIG. 1 and constituting the present invention is effective to complete 12 cycles and reduce the pressure in the chamber 36, and likewise in the brake pipe, as illustrated by FIG. 4, from 70.5 pounds per square inch to approximately 45 pounds per square inch. In other words, the novel brake apparatus constituting the present invention in the same period of time of approximately 35 seconds is effective to reduce the pressure in the chamber 36, and likewise in the brake pipe, seven pounds per square inch lower than is the prior art continual quick service valve device in this same period of time.

Accordingly, the superiority of applicant's novel brake apparatus shown in FIG. 1 over the prior art cycling-type continual quick service valve device shown in FIG. 2 is readily apparent.

RELEASE OF A "FULL SERVICE APPLICATION OF BRAKES"

Considering now the novel brake apparatus shown in FIG. 1 and assuming that a Full Service application of brakes has been effected on the vehicle or vehicles provided with this brake apparatus, to effect a release of this Full Service application, the engineer on the locomotive will move the handle of the engineer's brake valve device from its Full Service position arcuately back to its Release position whereupon this brake valve device will effect the supply of fluid under pressure to the train brake pipe and therefore to the brake pipe 1 to charge the brake pipe to the hereinbefore mentioned preselected normal charged value.

The fluid under pressure thus supplied to the brake pipe 1 will cause the brake control valve device 3 to effect a release of the brakes in the usual well known manner.

Fluid under pressure supplied to the brake pipe 1 will now flow to the chambers 39 and 36 on the opposite sides of the diaphragm 37 in the manner described under initial charging to charge these chambers and the quick service chamber 21, which is connected to the chamber 36 by the passageway 22 and branch passageway 22a, to the hereinbefore-mentioned preselected normal charged value. When the chambers 39 and 36 are both charged to the same pressure, which is the hereinbeforementioned preselected normal charged pressure of the brake pipe, by reason of the fact that the area on the upper side of the diaphragm is less than that of the lower side by an amount equal to the area of the valve stem 40, a differential of pressure will be established which acts in the upward direction to move the valve stem 40 upward until it abuts the bottom of the flat disc valve 51. This differential of pressure is not great enough to overcome the biasing force of the spring 53. Consequently, flat disc valve 51 is not unseated from the annular valve seat 50. When the diaphragm 37 is deflected upward to move the valve stem 40 into contact with the bottom side of the flat disc valve 51, the spring 67 acting on the lower side of the flat disc valve 65 is rendered effective to move the valve 65 and the spool type valve 70 upward until the flat disc valve 65 contacts the annular valve seat 64. Thus, when the brakes are completely released and the chambers 39 and 36 charged to the hereinbefore-mentioned preselected normal charged valve, the flat disc valve 51 will be seated on its seat 50 and the flat disc valve 65 will be seated on its seat 64, respectively.

INITIAL PARTIAL SERVICE APPLICATION OF BRAKES

To manually effect an initial partial service application of brakes on the train, the engineer will move the handle of the engineer's brake valve device on the locomotive arcuately from its release position into its service zone to a position corresponding to the degree of the initial service application desired. When the handle of the engineer's brake valve device is moved into the service zone, the brake valve device operates to vent fluid under pressure from the brake pipe 1 to atmosphere until the pressure in the brake pipe 1 is reduced a corresponding degree.

As the pressure in the brake pipe 1 is reduced, the brake control valve device 3 operates in the usual well known manner to effect an initial quick service reduction in brake pipe pressure and an initial partial service brake application on the freight car on which the brake control valve device 3 is installed, the degree of the partial service brake application corresponding to the degree of reduction of pressure effected in the brake pipe 1. The brake control valve device 3 then moves to a lap position.

Also, as the pressure in brake pipe 1 is reduced by flow therefrom to atmosphere via the engineer's brake valve device on the locomotive, fluid under pressure will flow at a rate controlled by the size of the choke 24 from the chamber 39 above the diaphragm 37 of the quick service valve device 8 to the brake pipe via the passageway 23, choke 24, passageway 35 in the nut 34, strainer device 33, chamber 32, passageway 15 and branch pipe 7, whereupon the quick service valve device 8 operates in the manner hereinbefore described in detail, to first effect the supply of fluid under pressure from the brake pipe to atmosphere and thereby provide a transmission wave of quick service reduction in brake pipe pressure serially from car to car through the train.

The initial quick service reduction in brake pipe pressure effected by flow from the brake pipe to atmosphere is effective to further reduce the pressure in the chamber 39 above the diaphragm 37, as hereinbefore explained. Therefore, this diaphragm 37 is deflected upward to cause the quick service valve mechanism 11 of the quick service valve device 8 to operate in the manner hereinbefore described in detail to unseat the annular valve seat 83 on the lower end of the spool valve 70 from the flat disc valve 65 and effect a corresponding reduction of the pressure in the chamber 36 and quick action chamber 21 after which, upon the completion of the cycle, the annular valve seat 83 is reseated on the flat disc valve 65 which at this time is biased against the outer annular valve seat 64 by the spring 67.

It will be understood that this quick valve mechanism 11 of the valve device 8 shown in FIG. 1 of the drawings will continue to repeat the above-described cycle so long as the engineer's brake valve device is effective to release fluid under pressure from the train brake pipe or, in other words, until this brake valve device is moved to its "Lap" position to discontinue the release of fluid under pressure from the train brake pipe to atmosphere. Accordingly, it is apparent that the number of repeated cycles performed by the cycling-type continual quick service valve device 8 shown in FIG. 1 varies in accordance with the degree of reduction of pressure effected in the train brake pipe 1 by the engineer's brake valve device on the locomotive.

SUPPLEMENTAL SERVICE APPLICATION OF BRAKES

Let it be supposed that subsequent to effecting an initial partial service application of brakes on the train, the engineer desires to effect a supplemental service brake application to increase the degree of the service brake application on the train. To do so, he will move the handle of the engineer's brake valve device arcuately from the position it occupies in its service zone in a direction away from its Release position to another position in its service zone corresponding to the degree of service brake application now desired on the train. When the handle of the engineer's brake valve device is thus moved from one position in the service zone to another position in this zone further away from its Release position, the brake valve device operates to again vent fluid under pressure from the brake pipe 1 until the pressure therein is reduced a corresponding degree.

As the pressure in the brake pipe 1 is thus further reduced, the brake control valve device 3 operates in the usual well known manner from its lap position to its service position to effect the supply of fluid under pressure from the auxilairy reservoir 4 to the brake cylinder device 6 to increase the degree of service brake application upon the vehicle on which the brake control valve device is installed, the increase in the degree of the brake application corresponding to the reduction in pressure effected in the brake pipe 1 by movement of the handle of the engineer's brake valve device on the locomotive from one position in its service zone to another position in this zone further from the Release position of the handle. The brake control valve device 3 will move back to its lap position when brake cylinder pressure has increased an amount corresponding to the reduction of pressure effected in the brake pipe 1.

As the pressure in the brake pipe 1 is further reduced by moving the handle of the engineer's brake valve device from one position in its service zone to another position in this zone further away from its Release position, the pressure in the chamber 39 above the diaphragm 37 of the quick service valve device 8 is likewise reduced in the manner hereinbefore described, whereupon the quick service valve device 8 operates in response to the reduction in pressure from the brake pipe 1 to atmosphere to thereby provide another transmission wave of quick service reduction in brake pipe pressure serially from car to car through the train.

This further reduction of the pressure in the train brake pipe effected by flow therefrom to atmosphere via the engineer's brake valve device is effective to again further reduce the pressure in the chamber 39 above the diaphragm 37 of the quick service valve mechanism 11 of the valve device 8 shown in FIG. 1 whereupon this valve device 8 will repeatedly operate in cycles to release fluid under pressure from the brake pipe 1 to atmosphere until the engineer's brake valve device is moved to its lap position to cut off further release of fluid under pressure from the train brake pipe to atmosphere via this brake valve device.

From the above, it is apparent that the quick service valve device 8 is operative in response to each successive engineer's brake valve device effected reduction in brake pipe pressure to effect the supply of fluid under pressure from the brake pipe 1 to atmosphere to cause continual and successive quick service reduction in brake pipe pressure as the pressure in the brake pipe 1 is reduced from its preselected normal charged value to a pressure corresponding to a full service brake application.

Subsequent to effecting a partial or full service brake application, such a brake application can always be released by the engineer moving the handle of the engineer's brake valve device arcuately from whatever position it occupies in its application zone back to its Release position whereupon the engineer's brake valve device will effect the supply of fluid under pressure to the train brake pipe to charge the brake pipe to the hereinbefore-mentioned preselected normal charged value, it, of course, being understood that each brake control valve device 3 on the respective cars in the train operates in response to this charging of the train brake pipe to release the brakes on the car on which the respective brake control valve device 3 is installed.

Having now described the invention what I claim as new and desire to secure by Letters Patents, is:

1. A cycling-type continual quick service means for a vehicle fluid pressure brake control apparatus operative in response to variations in pressure iin a normally charged brake pipe, said quick service means comprising:

a. a casing having formed therein a quick service chamber, b. a movable abutment supported by said casing and subject to the pressure in the brake pipe in a first chamber on one side thereof and to the pressure in the quick service chamber in a second chamber on the other side, said abutment being movable responsively to the preponderance of pressure in either chamber over that in the other, c. communication means via which to charge said first and second chambers and said quick service chamber from the brake pipe, d. a first valve means normally closing a communication between said first chamber and atmosphere and operative by said abutment to open said communication to vent said first chamber and thereby the brake pipe to atmosphere responsively to movement of said abutment in one direction as a result of an operator-initiated reduction of pressure in the brake pipe, e. a second valve means operatively connected to said abutment through a lost-motion connection and which opens said communication means to cause said quick service chamber and said second chamber to be charged from the brake pipe, said second valve means being operative by said abutment upon equalization of the pressures in said first and second chambers to cut off flow of fluid under pressure through said communication means to said second chamber and said quick service chamber, and being operative by said abutment, after said first valve means has opened said communication, to open a communication via which fluid under pressure is vented from said second chamber and said quick service chamber to atmosphere.

f. first choke means restricting the venting of fluid under pressure from said second chamber and said quick service chamber to such a rate as to insure the venting of fluid under pressure from the brake pipe to atmosphere by said first valve means for a certain predetermined time before the reduction of pressure in said second chamber and said quick service chamber is sufficient to cause a reversal of direction of movement of said abutment whereby said abutment is effective, upon initial movement in the reversed direction, to cause operation of said first valve means to terminate further venting of fluid under pressure from the brake pipe and, upon further movement of said abutment in said reversed direction, is effective to operate said second valve means to terminate further venting of said second chamber and said quick service chamber, g. second choke means cooperating with said communicating means to control the rate of flow of fluid under pressure from both the brake pipe and said first chamber to said second chamber and said quick service chamber, and wherein the improvement comprises:

h. means cooperating with said second choke means to enable the rate of supply of fluid under pressure to said second chamber and said quick service chamber to exceed the rate fo flow of flud under pressure therefrom.

2. A cycling-type continual quick service means for a vehicle fluid pressure brake control apparatus, as recited in claim 1, further characterized in that said means cooperating with said second choke means comprises a third choke means arranged in parallel with said second choke means whereby said second choke means and said third choke means, when arranged in parallel, enables a faster rate of supply of fluid under pressure to said second chamber and said quick service chamber than is provided solely by said second choke means.

3. A cycling-type continual quick service means for a vehicle fluid pressure brake control apparatus, as recited in claim 2, further characterized by means interposed between said third choke means and said second chamber and said quick service chamber to provide for flow of fluid under pressure from said third choke means to said second chamber and said quick service chamber and prevent backflow therefrom to said third choke means.

4. A cycling-type continual quick service means for a vehicle fluid pressure brake control apparatus, as recited in claim 2, further characterized by means enabling the rate of flow of fluid under pressure from the brake pipe to said first chamber to exceed the rate of flow of fluid under pressure from the brake pipe to said second chamber via said second and third choke means arranged in parallel.

5. A cycling-type continual quick service means for a vehicle fluid pressure brake control apparatus, as claimed in claim 2, further characterized in that said second choke means comprises two chokes arranged in series, and said third choke means is arranged in parallel with one of said two chokes arranged in series.

6. A cycling-type continual quick service means for a vehicle fluid pressure brake control apparatus, as recited in claim 3, further characterized in that said means interposed between said third choke means and said second chamber and said quick service chamber comprises a one-way flow valve means.

* * * * *